(12) United States Patent
Lahlou et al.

(10) Patent No.: US 12,705,495 B2
(45) Date of Patent: Aug. 11, 2026

(54) DATA LABELING FOR TRAINING ARTIFICIAL INTELLIGENCE SYSTEMS

(71) Applicant: Capital One Services, LLC, McLean, VA (US)

(72) Inventors: Tarek Aziz Lahlou, McLean, VA (US); Megan Lynn DeLaunay, Silver Spring, MD (US); Corey Jonathan Fyock, Manassas, VA (US); Erin Babinsky, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 1342 days.

(21) Appl. No.: 17/230,760

(22) Filed: Apr. 14, 2021

(65) Prior Publication Data

US 2022/0335311 A1 Oct. 20, 2022

(51) Int. Cl.

| | |
|---|---|
| ***G06N 3/09*** | (2023.01) |
| ***G06N 20/00*** | (2019.01) |
| *G06N 3/084* | (2023.01) |
| *G06N 5/04* | (2023.01) |

(52) U.S. Cl.

CPC ............... *G06N 3/09* (2023.01); *G06N 20/00* (2019.01); *G06N 3/084* (2013.01); *G06N 5/04* (2013.01)

(58) Field of Classification Search

CPC .......... G06N 3/09; G06N 20/00; G06N 3/084; G06N 5/04

See application file for complete search history.

(56) References Cited

U.S. PATENT DOCUMENTS

| | | | | |
|---|---|---|---|---|
| 5,444,796 | A * | 8/1995 | Ornstein | G06F 18/24 382/157 |
| 7,792,353 | B2 | 9/2010 | Forman et al. | |
| 7,792,770 | B1 * | 9/2010 | Phoha | G06N 20/00 706/45 |
| 7,958,068 | B2 | 6/2011 | Smith et al. | |
| 8,422,832 | B2 | 4/2013 | Makadia et al. | |
| 8,788,498 | B2 | 7/2014 | Kannan et al. | |
| 9,704,106 | B2 | 7/2017 | Welinder et al. | |
| 9,747,555 | B2 | 8/2017 | Ghosh et al. | |

(Continued)

OTHER PUBLICATIONS

Verbraeken et al. "A Survey on Distributed Machine Learning" Dec. 20, 2019, arXiv.org, arXiv:1912.09789 (Year: 2019).*

(Continued)

*Primary Examiner* — James D. Rutten

(74) *Attorney, Agent, or Firm* — Banner & Witcoff, Ltd.

(57) ABSTRACT

Systems, apparatuses, and methods are described for data labeling for training artificial intelligence systems. A candidate dataset comprising data samples and corresponding labels may be used to update an incumbent dataset comprise data samples and corresponding labels. The integrity of a data sample-label pair in the candidate dataset may be determined before the data sample-label pair is added to the incumbent dataset. For determining labeling integrity, a plurality of machine classifiers may be trained based on the incumbent dataset and portions of the candidate dataset. The plurality of machine classifiers as trained may be used to generate predicted labels for data samples in the candidate dataset. The integrity of the data sample-label pair in the candidate dataset may be measured based on the predicted labels for the data sample.

20 Claims, 9 Drawing Sheets

(56) References Cited

U.S. PATENT DOCUMENTS

| | | | | |
|---|---|---|---|---|
| 9,964,607 | B1 * | 5/2018 | Propes | G06V 10/454 |
| 2003/0236578 | A1 | 12/2003 | Gammerman et al. | |
| 2005/0027664 | A1 | 2/2005 | Johnson et al. | |
| 2017/0154370 | A1 * | 6/2017 | Ács | G06N 7/01 |
| 2018/0300576 | A1 | 10/2018 | Dalyac et al. | |
| 2021/0042577 | A1 | 2/2021 | Martin et al. | |
| 2021/0287135 | A1 * | 9/2021 | Shiono | G07C 5/008 |

OTHER PUBLICATIONS

Oct. 20, 2024—(WO) International Search Report and Written Opinion—App No. PCT/US2022/024750.

* cited by examiner

DATA LABELING FOR TRAINING ARTIFICIAL INTELLIGENCE SYSTEMS

TECHNICAL FIELD

The present disclosure is generally related to data labeling for training artificial intelligence systems.

BACKGROUND

Data samples may be assigned with labels. The pairs of data samples and corresponding labels for the data samples may be used for training artificial intelligence systems. The labeling of the data samples may be performed manually by human labelers and/or in other manners. If the data samples are inaccurately or incorrectly labeled, the resulting data sample-label pairs may contribute to degraded performance for purposes of training artificial intelligence systems.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Systems, apparatuses, and methods are described for improving data labeling for training artificial intelligence systems. A candidate dataset comprising data samples and corresponding labels may be used to update an incumbent dataset comprising data samples and corresponding labels. The integrity of a data sample-label pair in the candidate dataset may be determined before the data sample-label pair is added to the incumbent dataset. For determining labeling integrity, a plurality of machine classifiers may be trained based on the incumbent dataset and portions of the candidate dataset. The plurality of machine classifiers as trained may be used to generate predicted labels for data samples in the candidate dataset. The integrity of the data sample-label pair in the candidate dataset may be measured based on the predicted labels for the data sample. The machine classifiers, as trained based on the incumbent dataset and portions of the candidate dataset, may help point out potential ambiguity of a data sample in the candidate dataset, and/or help point out potential existence of a better or more accurate label for the data sample.

A computing device may determine an incumbent dataset comprising a first plurality of data samples and a first plurality of labels corresponding to the first plurality of data samples. The computing device may determine a candidate dataset for updating the incumbent dataset. The candidate dataset may comprise a second plurality of data samples and a second plurality of labels corresponding to the second plurality of data samples. The computing device may test the candidate dataset by a plurality of machine classifiers. Each machine classifier of the plurality of machine classifiers may comprise a plurality of model parameters. Testing the candidate dataset by a given machine classifier, of the plurality of machine classifiers, may comprise: determining, for the given machine classifier, a training subset of the candidate dataset and a remaining subset of the candidate dataset; training the given machine classifier, based on the incumbent dataset and the training subset, to refine the plurality of model parameters of the given machine classifier; and generating, based on the trained given machine classifier, a first plurality of predicted labels corresponding to a plurality of data samples of the remaining subset. Based on the testing the candidate dataset by the plurality of machine classifiers, the computing device may aggregate a second plurality of predicted labels generated based on multiple machine classifiers of the plurality of machine classifiers, the second plurality of predicted labels corresponding to a data sample of the second plurality of data samples. The computing device may determine a degree of consistency of the second plurality of predicted labels. Based on the degree of consistency of the second plurality of predicted labels not satisfying a threshold, the computing device may mark the data sample for additional review.

In some examples, the computing device may distribute the second plurality of data samples to a set of annotator devices for manual labeling. For each data sample of the second plurality of data samples: the computing device may receive a plurality of labels determined via the set of annotator devices; and the computing device may determine, based on the plurality of labels determined via the set of annotator devices, a consensus label. The second plurality of labels may comprise the consensus labels determined for the second plurality of data samples.

In some examples, the computing device may determine, based on the second plurality of data samples, a plurality of corresponding vector representations. The computing device may determine, based on the plurality of vector representations, degrees of similarity among the second plurality of data samples. Based on the degrees of similarity among the second plurality of data samples, the computing device may group the second plurality of data samples into a plurality of clusters of data samples. The computing device may cause display, via a set of annotator devices for manual labeling, of the plurality of clusters of data samples with indications of spatial relationships, among the second plurality of data samples, corresponding to the degrees of similarity. The computing device may receive an indication of a label assigned to a cluster of data samples of the plurality of clusters of data samples. The computing device may update, based on the label assigned to the cluster of data samples, the candidate dataset.

In some examples, the training subset may comprise a first selection of data samples from the candidate dataset. The remaining subset may comprise a second selection of data samples from the candidate dataset, the second selection of data samples being distinct from the first selection of data samples.

In some examples, the training subset determined for the given machine classifier of the plurality of machine classifiers may be different from a training subset determined for another machine classifier of the plurality of machine classifiers.

In some examples, based on the testing the candidate dataset by the plurality of machine classifiers, the computing device may aggregate a third plurality of predicted labels generated based on multiple machine classifiers of the plurality of machine classifiers, the third plurality of predicted labels corresponding to a second data sample of the second plurality of data samples. The computing device may determine a degree of consistency of the third plurality of predicted labels. Based on the degree of consistency of the third plurality of predicted labels satisfying the threshold, the computing device may determine a machine classifier consensus label, corresponding to the second data sample, based on the third plurality of predicted labels.

In some examples, the computing device may determine an annotator device consensus label, corresponding to the second data sample, of the second plurality of labels. Based on the machine classifier consensus label corresponding to the annotator device consensus label, the computing device may add the second data sample to the incumbent dataset.

In some examples, the computing device may determine an annotator device consensus label, corresponding to the second data sample, of the second plurality of labels. Based on the machine classifier consensus label not corresponding to the annotator device consensus label: the computing device may associate the second data sample with the machine classifier consensus label; and the computing device may mark the second data sample for additional review for removing an association of the second data sample with the annotator device consensus label.

In some examples, the computing device may update the incumbent dataset based on at least a portion of the candidate dataset. The computing device may generate, based on the updated incumbent dataset, a predicted label corresponding to a received data sample.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for data labeling for training artificial intelligence systems. A candidate dataset comprising data samples and corresponding labels may be used to update an incumbent dataset comprising data samples and corresponding labels. The integrity of a data sample-label pair in the candidate dataset may be determined before the data sample-label pair is added to the incumbent dataset. For determining labeling integrity, a plurality of machine classifiers may be trained based on the incumbent dataset and portions of the candidate dataset. The plurality of machine classifiers as trained may be used to generate predicted labels for data samples in the candidate dataset and/or a confidence metric indicating the likelihood that the predicted labels correctly annotate the candidate dataset. The integrity of the data sample-label pair in the candidate dataset may be measured based on the predicted labels for the data sample.

Figure 1:
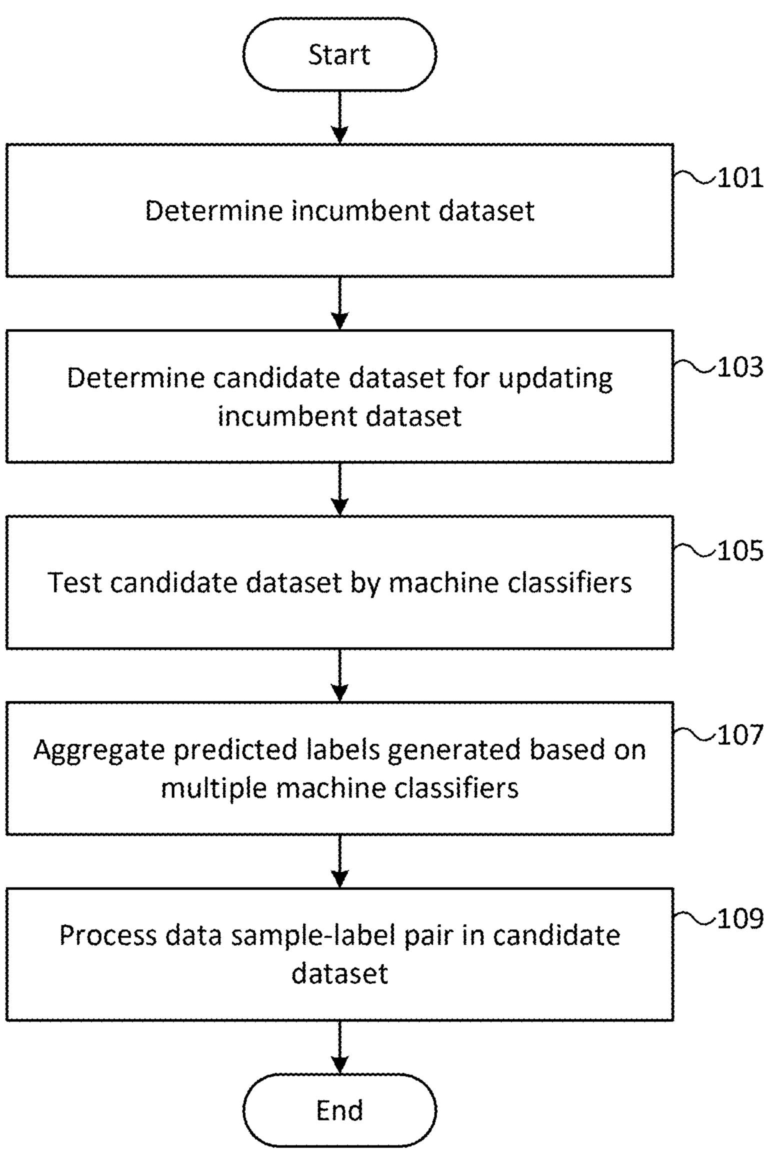
FIG. 1 is a flowchart showing an example of a method for data labeling in accordance with one or more aspects described herein.

FIG. 1 is a flowchart showing an example of a method for data labeling in accordance with one or more aspects described herein. The method may be performed by any type of computing device (e.g., a computing device as described herein). In step 101, a computing device may determine an incumbent dataset comprising a first plurality of data samples and a first plurality of labels corresponding to the first plurality of data samples. In step 103, the computing device may determine a candidate dataset for updating the incumbent dataset. The candidate dataset may comprise a second plurality of data samples and a second plurality of labels corresponding to the second plurality of data samples. In step 105, the computing device may test the candidate dataset by a plurality of machine classifiers. Each machine classifier of the plurality of machine classifiers may comprise a plurality of model parameters. Testing the candidate dataset by a given machine classifier, of the plurality of machine classifiers, may comprises: determining, for the given machine classifier, a training subset of the candidate dataset and a remaining subset of the candidate dataset; training the given machine classifier, based on the incumbent dataset and the training subset, to refine the plurality of model parameters of the given machine classifier; and generating, based on the trained given machine classifier, a first plurality of predicted labels corresponding to a plurality of data samples of the remaining subset. In step 107, based on the testing the candidate dataset by the plurality of machine classifiers, the computing device may aggregate a second plurality of predicted labels generated based on multiple machine classifiers of the plurality of machine classifiers, the second plurality of predicted labels corresponding to a data sample of the second plurality of data samples. In step 109, the computing device may, based on the second plurality of predicted labels, process a data sample-label pair, in the candidate dataset, corresponding to the data sample. For example, the computing device may, based on the second plurality of predicted labels, check the integrity of the data sample-label pair.

Figure 2:
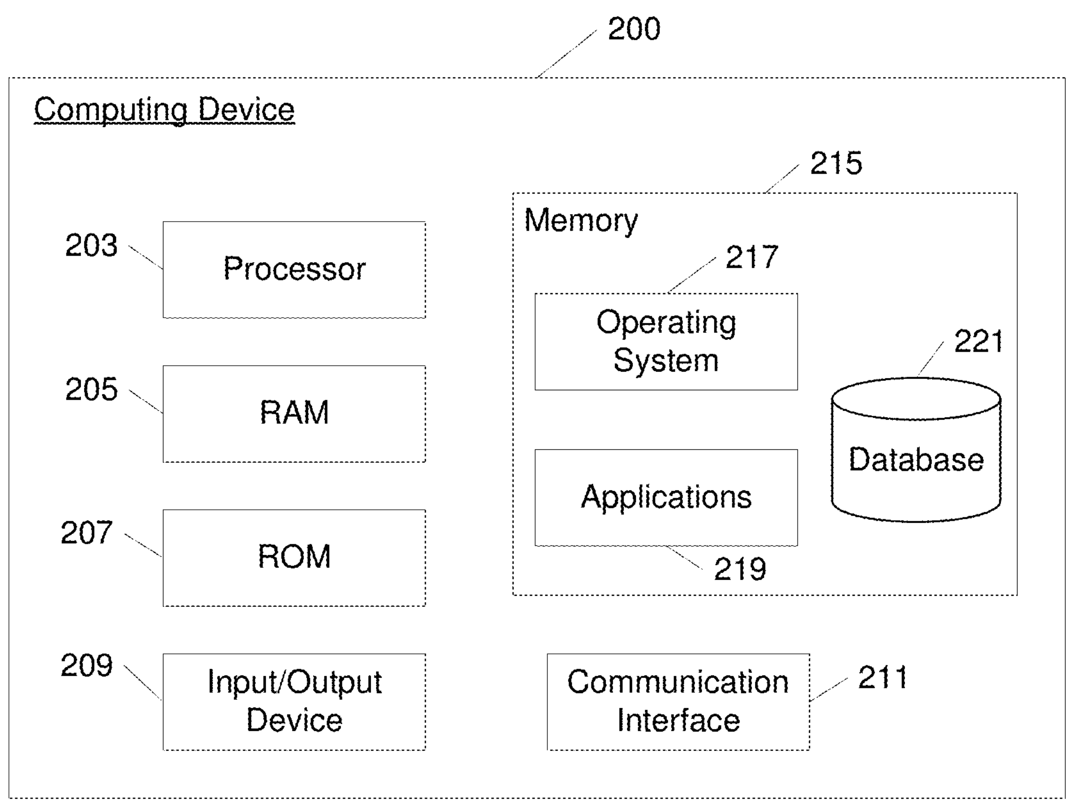
FIG. 2 shows an example computing device in accordance with one or more aspects described herein.

Turning now to FIG. 2, a conceptual illustration of a computing device 200 that may be used to perform any of the techniques as described herein is shown. Hardware elements of the computing device 200 may be used to implement any of the computing devices shown in FIG. 3

(e.g., the server 301, the data sample source device 305, any of the annotator devices 307A-307C) and any other computing devices discussed herein. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. Memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches including, but not limited to, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Any data described and/or transmitted herein may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 200. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML, encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 200 in front of one or more computing devices such that any external devices may communicate directly with the specialized hardware.

Figure 3:
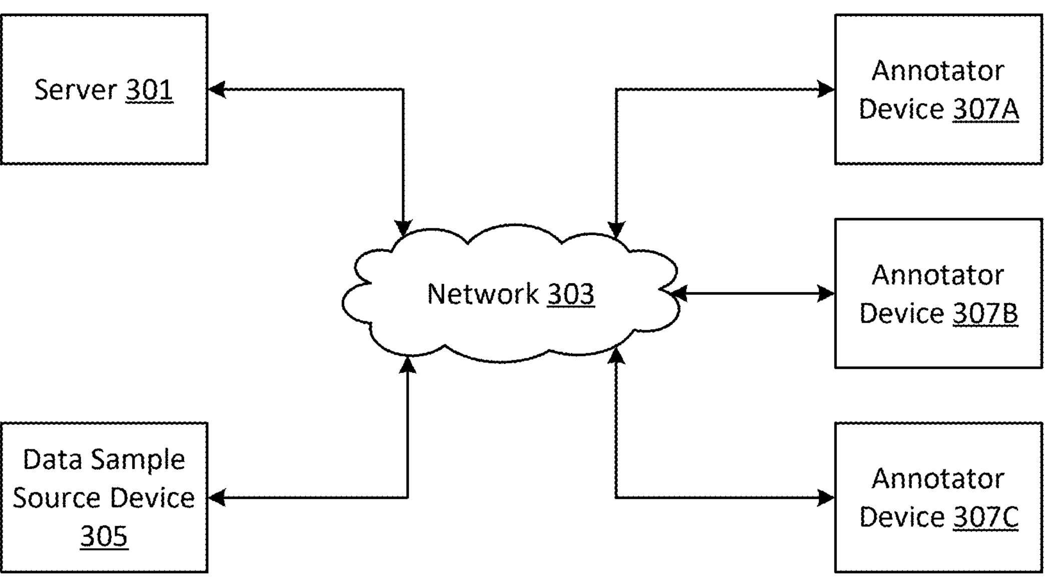
FIG. 3 is a schematic diagram showing an example system for data labeling in which various aspects described herein may be implemented.

FIG. 3 is a schematic diagram showing an example system for data labeling in which various aspects described herein may be implemented. The system may comprise an operating environment in which one or more aspects described herein may be implemented. The system may comprise one or more servers (e.g., server 301), one or more networks (e.g., network 303), one or more data sample source devices (e.g., data sample source device 305), and one or more annotator devices (e.g., annotator devices 307A-307C). It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 2.

The server 301 may comprise any type of computing device. From a physical standpoint, the server 301 may be implemented as a single device (such as a single server) or as a plurality of devices (such as a plurality of distributed servers). The server 301 may store, train, and/or provide a variety of machine classifiers as described herein. The server 301 may comprise and/or be implemented with one or more components in a similar manner as the computing device 200.

The network 303 may comprise a single network or a collection of multiple connected networks. The network 303 may comprise one or more of any of various types of information distribution networks, such as, without limitation, a satellite network, a telephone network, a cellular network, a Wi-Fi network, an Ethernet network, an optical fiber network, a coaxial cable network, a hybrid fiber coax network, etc. The network 303 may comprise a local area network (LAN), a wide area network (WAN), a backbone network, etc. The network 303 may comprise an Internet Protocol (IP) based network (e.g., the Internet). The network 303 may comprise a plurality of interconnected communication links (e.g., to connect the server 301, the data sample source device 305, the annotator devices 307A-307C, and/or other devices).

The data sample source device 305 may comprise any type of computing device. The data sample source device 305 may be configured to function as a source of data samples, and to provide data samples to other devices. A data sample that may be stored and/or provided by the data sample source device 305 may comprise, for example, a word, a group of multiple words, a phrase, a sentence, a paragraph, a collection of textual data, an utterance, a collection of audio data, an image, a clip of video, and/or the like. The data sample source device 305 may be configured to, for example, provide data samples to the server 301. The data sample source device 305 may exchange data with the annotator devices 307A-307C, provide training data to the server 301, provide input data to the server 301 for classification, and/or obtain classified data from the server 301 as described herein. The data sample source device 305 may comprise and/or be implemented with one or more components in a similar manner as the computing device 200.

An annotator device of the annotator devices 307A-307C may comprise any type of computing device. The annotator device may comprise, for example, a smartphone, a cell phone, a mobile communication device, a personal computer, a server, a tablet, a desktop computer, a laptop computer, a gaming device, a virtual reality headset, or any other type of computing device. The annotator device may provide data and/or interact with a variety of machine classifiers as described herein. An annotator device of the annotator devices 307A-307C may be configured to allow a user (e.g., a human labeler) to label data samples (e.g., via a user interface). The labeling information from the annotator device (e.g., indicating the associations of data samples and assigned labels) may be sent to the server 301. The annotator device may comprise and/or be implemented with one or more components in a similar manner as the computing device 200.

It should be noted that any computing device in the operating environment as shown in FIG. 3 may perform any of the processes and/or store any data as described herein. The data sample source device 305 and/or the server 301 may be publicly accessible and/or have restricted access. Access to a particular system may be limited to particular devices. Some or all of the data described herein may be stored using one or more databases. Databases may include, but are not limited to relational databases, hierarchical databases, distributed databases, in-memory databases, flat file databases, XML, databases, NoSQL databases, graph databases, and/or a combination thereof. The network 303 may include a local area network (LAN), a wide area network (WAN), a wireless telecommunications network, and/or any other communication network or combination thereof.

The data transferred to and from various computing devices in the operating environment as shown in FIG. 3 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. A file-based integration scheme or a service-based integration scheme may be utilized for transmitting data between the various computing devices. Data may be transmitted using various network communication protocols. Secure data transmission protocols and/or encryption may be used in file transfers to protect the integrity of the data such as, but not limited to, File Transfer Protocol (FTP), Secure File Transfer Protocol (SFTP), and/or Pretty Good Privacy (PGP) encryption. In some examples, one or more web services may be implemented within the various computing devices. Web services may be accessed by authorized external devices and users to support input, extraction, and manipulation of data between the various computing devices in the operating environment. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. Secure network appliances may include built-in features such as hardware-accelerated SSL and HTTPS, WS-Security, and/or firewalls. Such specialized hardware may be installed and configured in the operating environment shown in FIG. 3 in front of one or more computing devices such that any external devices may communicate directly with the specialized hardware.

The server 301 may store one or more datasets comprising data samples and ground-truth labels for the data samples. Such datasets may be used for training various types of artificial intelligence systems (e.g., neural networks). The server 301 may be configured to update the datasets, for example, with new data samples and corresponding labels. For example, the server 301 may receive new data samples from the data sample source device 305, and distribute the new data samples to annotator devices 307A-307C for manual labeling. A data sample of the new data samples may be labeled independently by multiple users (e.g., human labelers). And a consensus algorithm may be used to determine a consensus label for the data sample, based on the multiple labels for the data sample from multiple annotator devices.

If a consensus label is based on manual labeling for a piece of data, it may be subject to possibilities of errors or inaccuracies introduced by human labelers. For example, the quantity of available labels from which a human labeler may choose one label may be large (e.g., the human labelers may choose from 500 labels for labeling a piece of data), and the human labeler might not be able to always select an accurate label from the quantity of available labels. Additionally, a consensus from multiple human labelers on the labeling of a piece of data may be subject to possibilities of systematic errors introduced by the human labelers. The consensus from the human labelers might not always be the accurate or correct label for the piece of data.

Using machine classifiers to check the integrity of consensus labels from annotator devices and/or human labelers may help alleviate the challenges discussed above. A computing device (e.g., the server 301), after determining the annotator device consensus labels for data samples, may train a plurality of machine classifiers, may use the trained machine classifiers to generate predicted labels for the data samples, and may measure the integrity of the annotator device consensus labels based on the machine classifier predicted labels. The training of the machine classifiers may be based on an incumbent dataset comprising pairs of data samples and corresponding labels that may be considered to be ground truth. The set of data samples having annotator device consensus labels may be split into a training subset and a remaining subset in different ways for different machine classifiers. Each of the machine classifiers may additionally be trained based on its training subset and, after the training, generate predicted labels for data samples in its remaining subset. Based on the predicted labels generated by the machine classifiers, a computing device (e.g., the server 301) may aggregate the predicted labels for a particular data sample, and measure the integrity of the annotator device consensus label for the data sample based on the aggregated predicted labels. For example, a computing device (e.g., the server 301) may determine a degree of consistency among the aggregated predicted labels for the data sample, and may determine that the data sample may be ambiguous for purposes of using for artificial intelligence systems if the degree of consistency does not satisfy a threshold. A machine classifier consensus label for the data sample may be determined, if the degree of consistency satisfies the threshold. A computing device (e.g., the server 301) may compare the machine classifier consensus label for the data sample and the annotator device consensus label for the data sample, and may confirm the integrity of the manual labeling of the data sample if the machine classifier consensus label corresponds to the annotator device consensus label, or disconfirm the integrity of the manual labeling of the data sample if the machine classifier consensus label does not correspond to the annotator device consensus label. More details regarding using machine classifiers to check the integrity of data sample labeling are described below in connection with FIGS. 4A-4B.

Figure 4A:
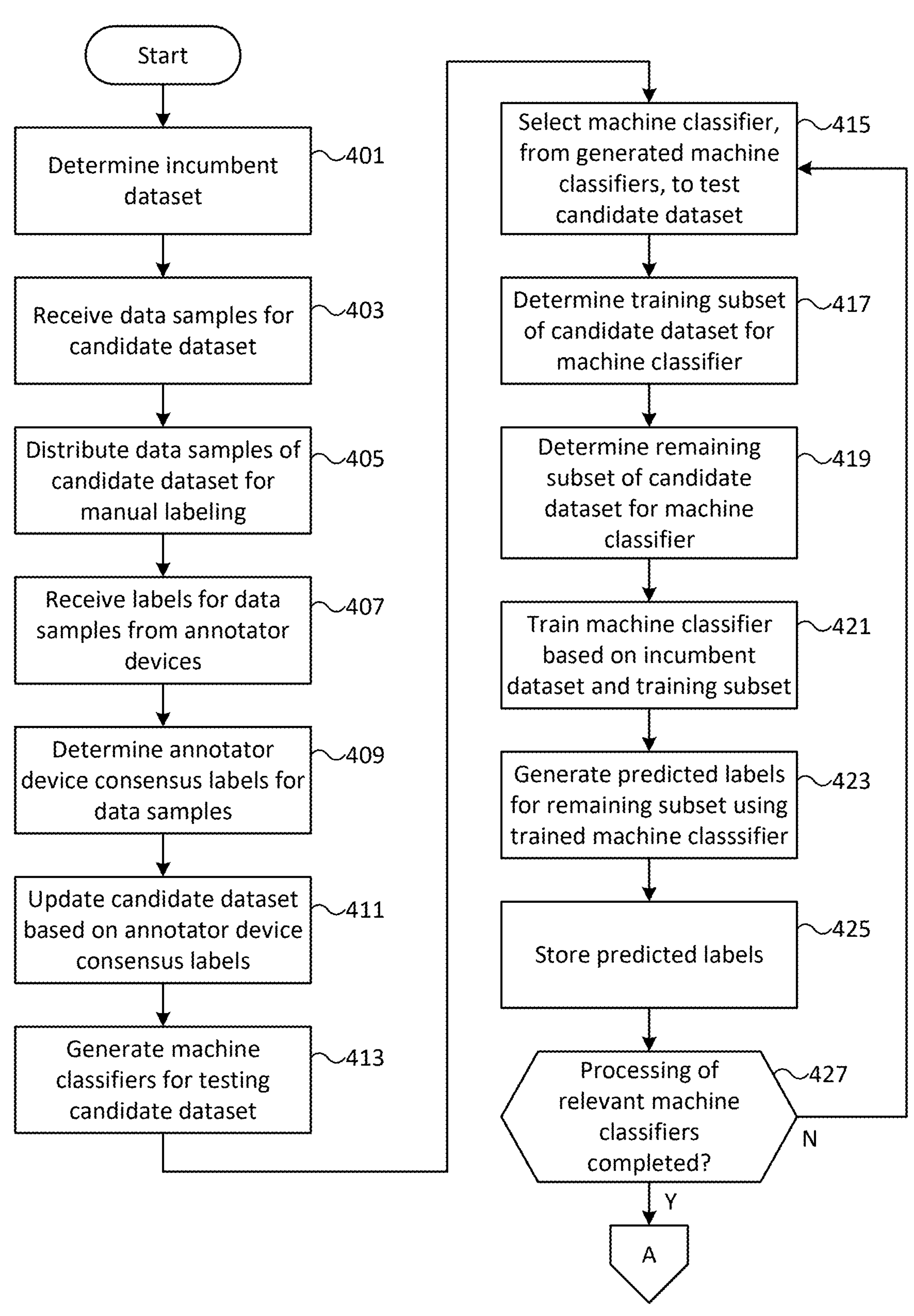
FIGS. 4A-4B show a flowchart of an example method for data labeling in accordance with one or more aspects described herein.
Figure 4B:
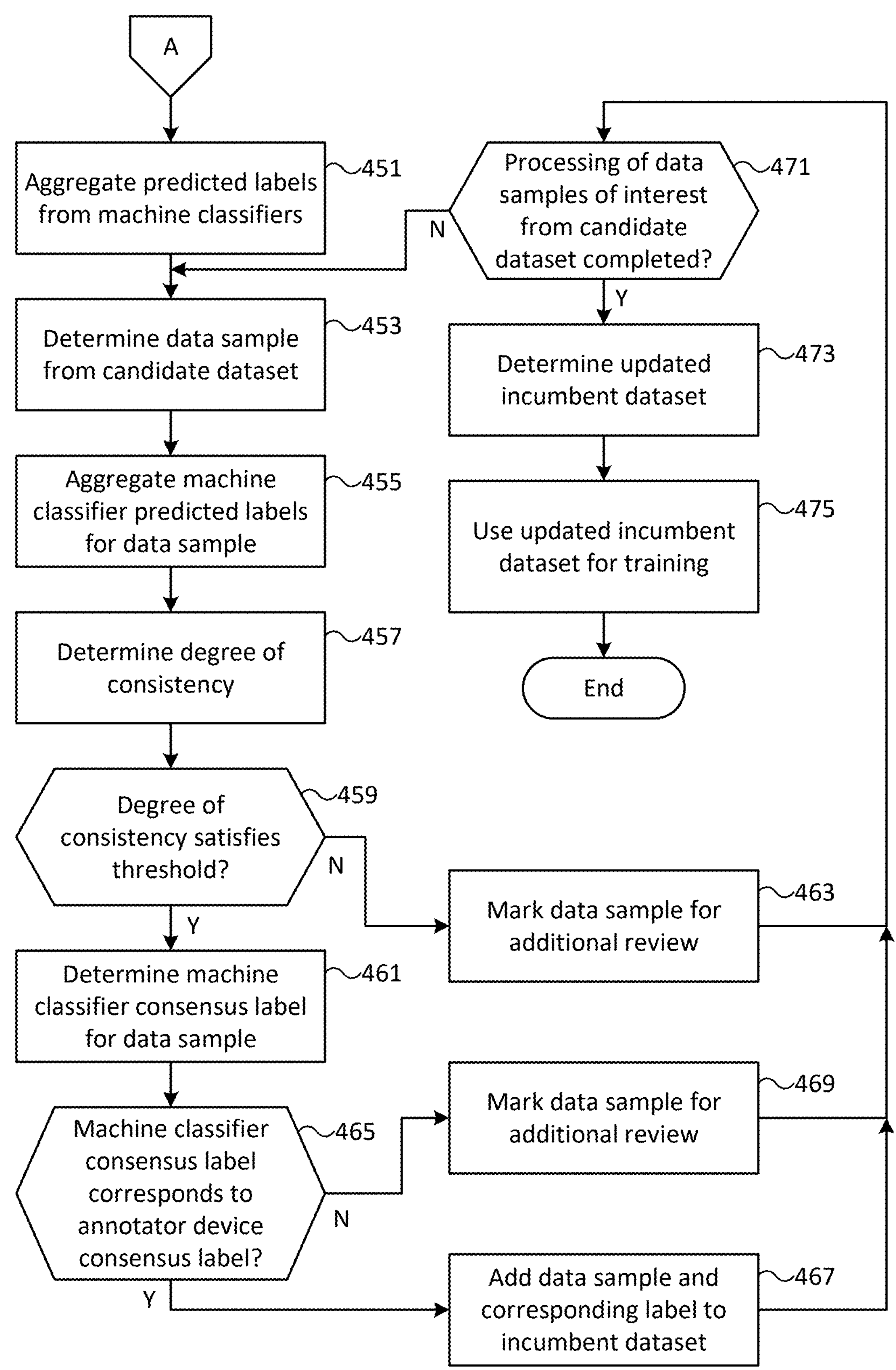

FIGS. 4A-4B show a flowchart of an example method for data labeling in accordance with one or more aspects described herein. The method may be performed, for example, by one or more of the system as discussed in connection with FIG. 3 (e.g., the server 301, the data sample source device 305, or one or more of the annotator devices 307A-307C). The steps of the method may be described as being performed by particular components and/or computing devices for the sake of simplicity, but the steps may be performed by any component and/or computing device, or by any combination of one or more components and/or one or more computing devices. The steps of the method may be performed by a single computing device or by multiple computing devices. One or more steps of the method may be omitted, added, rearranged, and/or otherwise modified as desired by a person of ordinary skill in the art.

In step 401, a computing device (e.g., the server 301) may determine an incumbent dataset. The incumbent dataset may comprise a plurality of data samples and a plurality of labels corresponding to the plurality of data samples. A data sample of the data samples of the incumbent dataset may comprise, for example, a word, a group of multiple words, a phrase, a sentence, a paragraph, a collection of textual data, an utterance, a collection of audio data, an image, a clip of video, and/or the like. A label corresponding to the data sample in the incumbent dataset may describe one or more attributes of the data sample. The incumbent dataset may be stored by the computing device (e.g., in a database of the computing device). The labels in the incumbent dataset may be considered to be ground truth for the corresponding data samples. The data samples and the corresponding labels in the incumbent dataset may be used for training various types of artificial intelligence systems, such as neural networks.

In step 403, the computing device may receive data samples for a candidate dataset. The candidate dataset may be used, for example, for updating the incumbent dataset. The data samples for the candidate dataset may be received from various types of computing devices, such as a data sample source device (e.g., the data sample source device 305). The received data samples may be stored in the candidate dataset. The data samples of the candidate dataset may be of a type same as the data samples in the incumbent dataset. For example, each of the data samples in both the incumbent dataset and the candidate dataset may comprise a word. Labels for the data samples in the candidate dataset may be manually assigned (e.g., via one or more annotator devices) and/or updated or otherwise processed based on machine classifiers, as described in greater detail below.

In step 405, the computing device may distribute (e.g., to annotator devices 307A-307C) the data samples of the candidate dataset for manual labeling. For example, the data samples of the candidate dataset may be sent to each of a plurality of annotator devices. Each of the plurality of annotator devices may be associated with a human labeler, and may be configured to display the data samples of the candidate dataset to the human labeler. The human labeler may review each of the data samples displayed on his or her annotator device, and assign a label to the reviewed data sample (e.g., by selecting the label from a list of available labels, by typing the label to the device, and/or the like). The labels assigned by a particular human labeler to the data samples of the candidate dataset may be sent back to the computing device (e.g., the server 301).

Additionally or alternatively, in order to reduce the cognitive burden on the human labeler when labeling the data samples, the computing device (e.g., the server 301), an annotator device, and/or any other device may be configured to process the data samples and group the data samples into different clusters, wherein each cluster of the different clusters may comprise data samples having relatively close relationships with each other (e.g., word data samples having similar semantic meanings), and to display the data samples with indications of the clusters. Data labeling using clusters of data samples are described in greater detail below in connection with FIG. 7.

In step 407, the computing device may receive labels for data samples from annotator devices. For example, the computing device may receive, from each of the annotator devices to which data samples of the candidate dataset are distributed in step 405, data indicating a label assigned to each of the data samples via that particular annotator device. The data received by the computing device from an annotator device may, for example, indicate pairs or associations of data samples and labels, wherein each pair or association may indicate a particular data sample and the label, for that data sample, assigned via the annotator device (e.g., by a human labeler).

In step 409, the computing device may determine annotator device consensus labels for data samples of the candidate dataset. For a particular data sample in the candidate dataset, multiple labels may be received respectively from multiple different annotator devices. Based on the data received by the computing device from annotator devices in step 407, the computing device may determine (e.g., extract), for each data sample of the data samples of the candidate dataset, multiple labels assigned to the data sample via multiple annotator devices. The computing device may then determine an annotator device consensus label for each data sample of the data samples of the candidate dataset. The annotator device consensus label for a particular data sample may be determined based on any type of consensus algorithm.

For example, the annotator device consensus label may be determined based on a majority consensus. The annotator device consensus label for a data sample may be determined to be a label that a majority of the annotator devices via which a label has been assigned to the data sample agrees on. If an annotator device consensus label is not produced, or otherwise cannot be determined, for a data sample after applying a consensus algorithm (e.g., a majority of annotator devices is not present after applying a majority consensus), the data sample may, for example, be excluded from the candidate dataset, and/or be marked for additional review by an administrator of the system or any other person of interest.

In step 411, the computing device may update the candidate dataset based on the annotator device consensus labels as determined in step 409. For example, the computing device may determine whether an annotator device consensus label for a data sample in the candidate dataset is successfully determined in step 409. If the annotator device consensus label is successfully determined, the computing device may associate or pair the data sample in the candidate dataset with the determined annotator device consensus label for the data sample. If the annotator device consensus label is not successfully determined, the computing device may, for example, exclude the data sample from the candidate dataset, and/or mark the data sample for additional review by an administrator of the system or any other person of interest. After being updated based on the annotator device consensus labels as determined in step 409, the candidate dataset may comprise pairs or associations of data samples and annotator device consensus labels, wherein each pair or association may comprise a particular data sample and its corresponding annotator device consensus label.

In step 413, the computing device may generate a plurality of machine classifiers for testing the candidate dataset. The quantity of the generated machine classifiers may be any quantity (e.g., 10, 50, 100, 500, 900, etc.) as desired by a person of ordinary skill in the art. Each of the machine classifiers may comprise any type of model configured to classify a particular input data sample into one or more categories. For example, the machine classifier may be configured to process an input data sample and produce a label, for the input data sample, indicating a category to which the input data sample may belong. For example, the machine classifier may comprise an artificial neural network, a decision tree, a support vector machine, a logistic regression model, a linear discriminant analysis model, a k-nearest neighbors model, a naive Bayes model, and/or the like. It should be readily apparent to a person having ordinary skill in the art that a variety of machine classifiers may be utilized including (but not limited to) decision trees, k-nearest neighbors, support vector machines (SVM), neural networks (NN), recurrent neural networks (RNN), convolutional neural networks (CNN), probabilistic neural networks (PNN), and transformer-based architectures. RNNs may further include (but are not limited to) fully recurrent networks, Hopfield networks, Boltzmann machines, self-organizing maps, learning vector quantization, simple recurrent networks, echo state networks, long short-term memory networks, bi-directional RNNs, hierarchical RNNs, stochastic neural networks, and/or genetic scale RNNs. In one or more examples, a combination of machine classifiers may be utilized, more specific machine classifiers when available, and general machine classifiers at other times may further increase the accuracy of predictions.

Each machine classifier of the generated machine classifiers may comprise a plurality of model parameters. For example, a neural network may comprise a number of layers and each layer may comprise a number of nodes. Each node of the neural network may be interconnected with other nodes of the neural network (e.g., connected with nodes in its preceding layer and/or its succeeding layer). Component values of a piece of input data to the neural network may progress through the nodes and/or layers of the neural network, to produce the output data. After receiving the input data, the value of each particular node of the neural network may be calculated to be the result of a function of the values of other nodes (e.g., in the particular node's preceding layers) of the neural network, wherein the function may comprise a number of parameters (e.g., a number of weights respectively for the other nodes contributing to the value of the particular node).

Each machine classifier of the generated machine classifiers may be trained using machine learning algorithms (e.g., supervised learning algorithms). The training of the machine classifier may refine the plurality of parameters of the machine classifier, such that the output data of the machine classifier, for a piece of input data, as calculated based on the plurality of parameters may approach the desired output results (e.g., the ground truth, the desired output results as specified by human users, and/or the like). For example, the training of a neural network may be based on backpropagation and use stochastic gradient descent and/or other methods to adjust its model parameters so as to minimize a cost function indicating a difference between the desired output results for input data and the output results produced by the neural network for the input data.

In generating the machine classifiers, the computing device may initialize the model parameters of the machine classifiers. For example, the computing device may assign random values to the model parameters of the machine classifiers. The generated machine classifiers may be trained, and/or may be used for helping improve the integrity of the annotator device consensus labels for the data samples of the candidate dataset, as described in greater detail below.

The computing device may use each machine classifier, of one or more of the machine classifiers as generated in step 413, to process and/or test the candidate dataset. In step 415, the computing device may select a machine classifier, from the generated machine classifiers, to test the candidate dataset. For example, the computing device may sequentially select each of the one or more of the generated machine classifiers. The computing device may test the candidate dataset by a plurality of machine classifiers, wherein each machine classifier of the plurality of machine classifiers may comprise a plurality of model parameters. Testing the candidate dataset by a given machine classifier, of the plurality of machine classifiers, may comprise one or more of the processes as described in greater detail below (e.g., in connection with steps 417, 419, 421, 423, 425, etc.).

In step 417, the computing device may determine a training subset, of the candidate dataset, for the machine classifier as selected in step 415. The training subset for the machine classifier may comprise, for example, a quantity of data sample-annotator device consensus label pairs randomly selected from the candidate dataset. Data may be selected from the candidate dataset and added to the training subset, such that the training subset may comprise a particular percentage (e.g., 80%) of the candidate dataset. The percentage may be specified by an administrator of the system and/or any other person of interest.

In step 419, the computing device may determine a remaining subset, of the candidate dataset, for the machine classifier as selected in step 415. The remaining subset for the machine classifier may comprise, for example, a plurality of data sample-annotator device consensus label pairs, in the candidate dataset, remaining unselected for the training subset for the machine classifier. The remaining subset may comprise a particular percentage (e.g., 20%) of the candidate dataset. The percentage may be specified by an administrator of the system and/or any other person of interest.

The computing device may determine different training subsets comprising different collections of data sample-annotator device consensus label pairs for different machine classifiers selected in step 415. Two such collections may or may not overlap with each other. And the remaining subsets respectively for different machine classifiers may be accordingly different from each other. Two such remaining subsets may or may not overlap with each other. For example, the computing device may split the candidate dataset into the training subset and the remaining subset in different ways for different machine classifiers, so that the machine classifiers may be trained using different portions of the candidate dataset and, after the training, process (e.g., predict labels for) different remaining portions of the candidate dataset, as described in greater detail below.

In step 421, the computing device may train, based on the incumbent dataset as determined in step 401 and the training subset as determined in step 417, the machine classifier as selected in step 415. The incumbent dataset and the training subset may comprise a plurality of data sample-label pairs, wherein each data sample-label pair may comprise a particular data sample and a label corresponding to the data sample. The data sample-label pairs in the incumbent dataset may be considered to comprise ground-truth label data for data samples. The data sample-label pairs in the training subset may comprise the annotator device consensus label data for data samples.

During the training, the computing device may adjust and/or refine the plurality of model parameters of the machine classifier, so that the labels as predicted and output by the machine classifier for data samples from the incumbent dataset and/or the training subset may approach or be the same as the labels, corresponding to the data samples, indicated in the incumbent dataset and/or the training subset. For example, the training of the machine classifier (e.g., a neural network) may be based on backpropagation and use stochastic gradient descent and/or other methods to adjust its model parameters so as to minimize a cost function indicating a difference between the desired output results for input data and the output results produced by the machine classifier (e.g., a neural network) for the input data. An administrator of the system and/or any other person of interest may, for example, specify a length of time for training the machine classifier, and/or a degree of completeness for training the machine classifier, as he or she desires under different circumstances (e.g., in order to reduce the amount of time and/or computational resources used for training the machine classifiers, or in order to have a greater degree of confidence in the trained machine classifiers' compliance with the training data).

In step 423, the computing device may use the machine classifier as trained in step 421 to generate predicted labels for the data samples of the remaining subset for the machine classifier. The predicted labels may, for example, include a confidence metric indicating the likelihood that the predicted labels correctly annotate the candidate dataset. After the training of the machine classifier, the computing device may input, to the trained machine classifier, each data sample in the remaining subset as determined in step 419 for the machine classifier. The trained machine classifier may process each input data sample, may predict a label for each input data sample, and may output the predicted label for each input data sample.

In step 425, the computing device may store the predicted labels, for the data samples in the remaining subset, as determined in step 423. The predicted labels may be stored for subsequent processing (e.g., extracting, aggregating, analyzing, and/or the like), as described in greater detail below in connection with FIG. 4B.

In step 427, the computing device may determine whether the processing (e.g., as described in connection with steps 417, 419, 421, 423, 425) of relevant machine classifiers of the machine classifiers as generated in step 413 is completed. For example, the relevant machine classifiers may comprise all of the generated machine classifiers, and the computing device may be configured to process all of the generated machine classifiers. Alternatively, the relevant machine classifiers may comprise some particular ones of the generated machine classifiers. The computing device may be configured to process some particular ones of the generated machine classifiers, for example, if the computing device is configured to be interested in checking the integrity of the annotator device consensus labels for one or more particular data samples in the candidate dataset, and the computing device may be configured to process those generated machine classifiers the remaining subset for each of which may comprise the one or more particular data samples. If the processing of relevant machine classifiers of the machine classifiers as generated in step 413 is completed (step 427: Y), the method may proceed to step 451. If the processing of relevant machine classifiers of the machine classifiers as generated in step 413 is not completed (step 427: N), the method may repeat step 415. In step 415, the computing device may select a next machine classifier (e.g., of the relevant machine classifiers, such as some or all of the generated machine classifiers) for processing.

With reference to FIG. 4B, in step 451, the computing device may aggregate predicted labels, for data samples in the candidate dataset, that are generated by machine classifiers in step 423. For example, the predicted labels generated by each machine classifier in step 423 may be stored in one or more associated databases. Because two such machine classifiers may generate predicted labels for the data samples in their respective remaining subsets, which may have different data samples, but may also have overlapping data samples, multiple machine classifiers may generate multiple predicted labels for one single data sample in the candidate dataset. Additionally or alternatively, the weighting of the labels may be calculated based on the confidence metrics associated with the labels. In this way, labels with a higher probability of correctly annotating a data sample may be preferred to those labels with a lower probability of a correct annotation.

The computing device may check the integrity of annotator device consensus labels for data samples in the candidate dataset, based on the predicted labels, for the data samples, generated by the trained machine classifiers. For example, the computing device may check the integrity of annotator device consensus labels for all of the data samples in the candidate dataset. Alternatively, the computing device may check the integrity of annotator device consensus labels for some particular ones of the data samples in the candidate dataset, as desired by a person of ordinary skill in the art. In step 453, the computing device may determine a data sample of interest from the candidate dataset. For example, the computing device may sequentially determine each of the data samples of interest from the candidate dataset.

In step 455, the computing device may aggregate the machine classifier predicted labels for the data sample as determined in step 453. Because two machine classifiers may generate predicted labels for the data samples in their respective remaining subsets, which may have different data samples, but may also have overlapping data samples, multiple machine classifiers may generate multiple predicted labels for one single data sample in the candidate dataset. The computing device may determine the predicted labels, generated by multiple machine classifiers, for the data sample as determined in step 453.

In step 457, the computing device may determine a degree of consistency among the machine classifier predicted labels for the data sample as determined in step 453. For example, the computing device may determine a particular predicted label having more votes from the machine classifiers than any other predicted label. The degree of consistency may be represented, for example, by a number of machine classifiers that vote for the particular predicted label divided by the total number of machine classifiers that generated predicted labels for the data sample.

In step 459, the computing device may determine whether the degree of consistency as determined in step 457 satisfies (e.g., meets, exceeds, etc.) a threshold. The threshold may be, for example, configured to be any threshold degree as desired by a person of ordinary skill in the art (e.g., 70%, 80%, 90%, 95%, etc.). If the degree of consistency satisfies the threshold (step 459: Y), the method may proceed to step 461. If the degree of consistency does not satisfy the threshold (step 459: N), the method may proceed to step 463.

In step 463, the computing device may mark the data sample (as determined in step 453) for additional review. The determination that the degree of consistency among the machine classifier predicted labels for the data sample does not satisfy the threshold may indicate that the data sample may be ambiguous in its semantic meaning and/or in its other aspects, and that the data sample might not be suitable for use in artificial intelligence systems (e.g., for use in training artificial intelligence systems). The data sample may be marked for additional review, for example, by an administrator of the system and/or by any other person of interest, for confirming whether to exclude the data sample (and data associated with the data sample) from the candidate dataset. For example, the computing device may cause display, to the administrator, of an indication that the degree of consistency among the machine classifier predicted labels for the data sample does not satisfy the threshold, and may prompt the administrator to confirm whether to exclude the data sample from the candidate dataset.

In step 461, the computing device may determine a machine classifier consensus label for the data sample (as determined in step 453). The computing device may determine the machine classifier consensus label to be a predicted label, for the data sample, that has more votes, from the machine classifiers that generated predicted labels for the data sample, than any other predicted label for the data sample.

In step 465, the computing device may determine whether the machine classifier consensus label for the data sample corresponds to (e.g., is same as) the annotator device consensus label for the data sample (as determined in step 409). For example, the computing device may retrieve (e.g., from the candidate dataset) the annotator device consensus label (as determined in step 409) for the data sample. The computing device may compare the machine classifier consensus label for the data sample and the annotator device consensus label for the data sample, and may determine whether they are the same. If the machine classifier consensus label for the data sample corresponds to the annotator device consensus label for the data sample (step 465: Y), the method may proceed to step 467. If the machine classifier consensus label for the data sample does not correspond to the annotator device consensus label for the data sample (step 465: N), the method may proceed to step 469.

In step 467, the computing device may add the data sample and the label for the data sample (e.g., the machine classifier consensus label for the data sample or the annotator device consensus label for the data sample, both of which may be the same in this situation) to the incumbent dataset. For example, a data sample-label pair for the data sample may be added to the incumbent dataset.

In step 469, the computing device may mark the data sample for additional review. Because the machine classifiers have been trained based on, in addition to portions of the candidate dataset, the incumbent dataset (e.g., as described in connection with step 421), the machine classifiers may be able to correct labeling errors, for a data sample, that may be introduced by human labelers if the machine classifiers have consensus on a predicted label for the data sample and have a great degree of confidence in that consensus. Additionally, when the schema of labels has a large quantity (e.g., 400, 500, 600, etc.) of distinct labels that may be used to be assigned to a data sample, the human labeler might not be able to always identify an accurate label for the data sample. For example, when the schema of labels for data samples comprising images comprises detailed labels such as different cat species including "Bengal Cat," "Bombay Cat," "Manx Cat," "Toyger Cat," etc., in addition to or instead of a more general label "Cat," the human labeler might not be able to always assign an accurate label (e.g., "Bengal Cat") to a data sample, but may instead assign an inaccurate label (e.g., "Toyger Cat") or a more general label (e.g., "Cat") to the data sample. The machine classifiers as trained based on the incumbent dataset and portions of the candidate dataset may be able to suggest a more accurate label if human labelers choose an inaccurate label or a more general label.

Based on determining that the machine classifier consensus label for the data sample does not correspond to the annotator device consensus label for the data sample, the computing device may mark the data sample for additional review, for example, by an administrator of the system and/or by any other person of interest. The computing device may associate the data sample in the candidate dataset with the machine classifier consensus label, and may remove the previous association of the data sample with the annotator device consensus label in the candidate dataset. The data sample may be marked for additional review for confirming whether the data sample is to be associated with the machine classifier consensus label and is to be not associated with the annotator device consensus label. For example, the computing device may cause display, to the administrator and/or to human labelers, of an indication that the machine classifier consensus label for the data sample is different from the annotator device consensus label, and may prompt the administrator and/or human labelers to confirm whether the data sample is to be associated with the machine classifier consensus label, and is to be not associated with the annotator device consensus label.

If the administrator and/or human labelers confirm (e.g., by consensus) that the data sample is to be associated with the machine classifier consensus label, the data sample and the machine classifier consensus label as a pair may be added to the incumbent dataset. If the administrator and/or human labelers do not confirm (e.g., by consensus) that the data sample is to be associated with the machine classifier consensus label, the data sample (and the machine classifier consensus label) might not be added to the incumbent dataset. If the administrator and/or human labelers believe (e.g., by consensus) that the data sample is to be associated with the annotator device consensus label, which may be in conflict with the machine classifiers' suggestion, the data sample may be marked for further review and/or may be further handled (e.g., by removing the data sample from the candidate dataset, by not adding the data sample to the incumbent dataset, etc.) as desired by the administrator and/or any other person of interest.

In step 471, the computing device may determine whether processing (e.g., as described in steps 455, 457, 459, 461, 463, 465, 467, 469) of data samples of interest from the candidate dataset is completed. The computing device may check the integrity of annotator device consensus labels for data samples in the candidate dataset. For example, the computing device may check the integrity of annotator device consensus labels for all of the data samples in the candidate dataset. The data samples of interest may comprise all of the data samples in the candidate dataset. Alternatively, the computing device may check the integrity of annotator device consensus labels for some particular ones of the data samples in the candidate dataset, as desired by a person of ordinary skill in the art. The data samples of interest may comprise the some particular ones of the data samples in the candidate dataset. If the processing of data samples of interest from the candidate dataset is completed (step 471: Y), the method may proceed to step 473. In the processing of data samples of interest from the candidate dataset is not completed (step 471: N), the method may repeat step 453. In step 453, the computing device may determine a next data sample of interest from the candidate dataset. For example, the computing device may sequentially determine each of the data samples of interest from the candidate dataset.

In step 473, the computing device may determine an updated incumbent dataset. The incumbent dataset may be updated based on adding new data sample-label pairs (e.g., from the candidate dataset) to the incumbent dataset (e.g., as described in step 467 and/or other steps). The data sample-label pairs added to the incumbent dataset may have been checked for labeling integrity using machine classifiers as described above. The computing device may be configured to update the incumbent dataset based on at least a portion of the candidate dataset, as described above.

In step 475, the computing device may use the updated incumbent dataset for training various types of systems, such as machine classifiers or other types of systems (e.g., artificial intelligence systems, artificial neural networks, etc.). For example, machine classifiers as trained based on the updated incumbent dataset may be used to process new data samples received by the computing device, and may generate predicted labels for the received data samples.

Figure 5A:
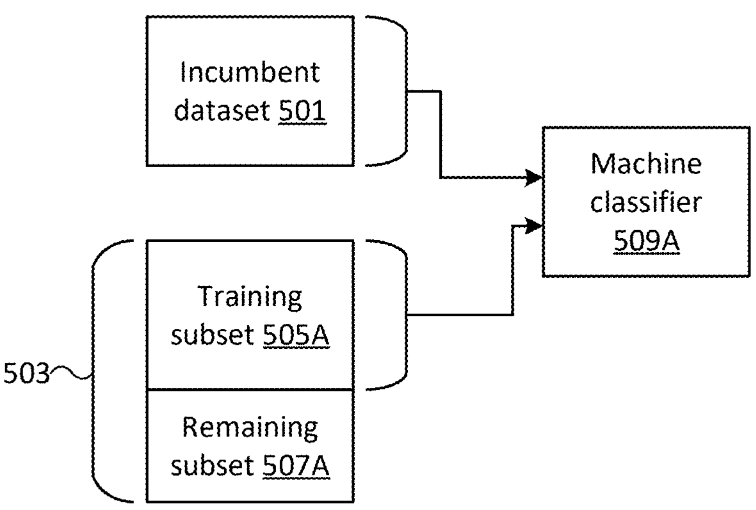
FIG. 5A shows a schematic diagram of an example process for training a machine classifier in accordance with one or more aspects described herein.

FIG. 5A shows a schematic diagram of an example process for training a machine classifier in accordance with one or more aspects described herein. The process may be associated with a machine classifier 509A, an incumbent dataset 501, and a candidate dataset 503. The incumbent dataset 501 may comprise data sample-label pairs, wherein each pair may comprise a data sample and a corresponding label that may be considered to be ground truth. The candidate dataset 503 may comprise data sample-annotator device consensus label pairs, wherein each pair may comprise a data sample and a corresponding annotator device consensus label that may be based on a consensus of labels assigned to the data sample via annotator devices (e.g., by human labelers).

The candidate dataset 503 may be split into a training subset 505A and a remaining subset 507A. The training subset 505A may comprise data sample-annotator device consensus label pairs that are (e.g., randomly) selected from the candidate dataset 503. The remaining subset 507A may comprise data sample-annotator device consensus label pairs that are unselected for the training subset 505A. The incumbent dataset 501 and the training subset 505A may be used for training the machine classifier 509A.

Figure 5B:
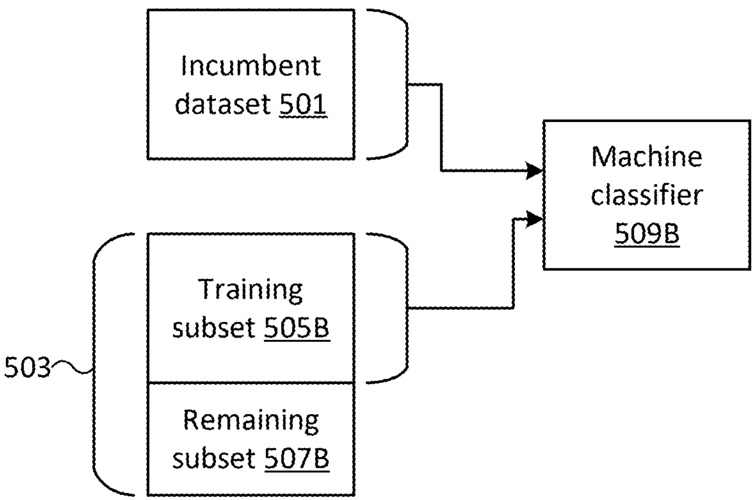
FIG. 5B shows a schematic diagram of an example process for training a machine classifier in accordance with one or more aspects described herein.

FIG. 5B shows a schematic diagram of an example process for training a machine classifier in accordance with one or more aspects described herein. The process may be associated with a machine classifier 509B, the incumbent dataset 501, and the candidate dataset 503.

The candidate dataset 503 may be split into a training subset 505B and a remaining subset 507B. The training subset 505B may comprise data sample-annotator device consensus label pairs that are (e.g., randomly) selected from the candidate dataset 503. The remaining subset 507B may comprise data sample-annotator device consensus label pairs that are unselected for the training subset 505B. The incumbent dataset 501 and the training subset 505B may be used for training the machine classifier 509B.

As shown in FIGS. 5A-5B, the candidate dataset 503 may be split into a training subset and a remaining subset in different ways for different machine classifiers. For example, the training subset 505A may comprise a first collection of data sample-annotator device consensus label pairs, the training subset 505B may comprise a second collection of data sample-annotator device consensus label pairs, and the first collection and the second collection may have different data sample-annotator device consensus label pairs, and may or may not comprise overlapping data sample-annotator device consensus label pairs. Although FIGS. 5A-5B show the training of two machine classifiers 509A-509B, additional or alternative machine classifiers may be trained similarly.

Figure 6:
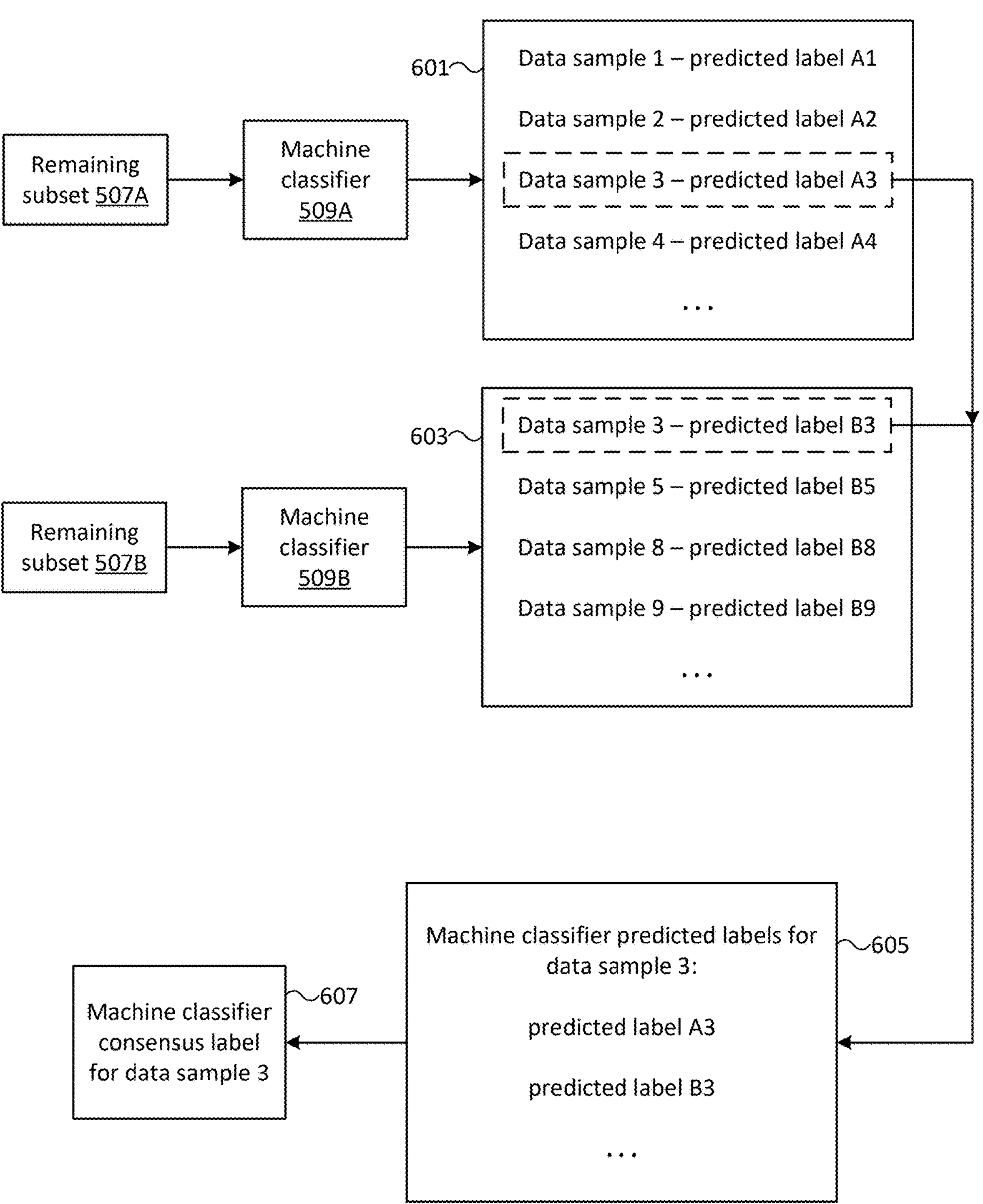
FIG. 6 shows a schematic diagram of an example process for using machine classifiers to process data samples in accordance with one or more aspects described herein.

FIG. 6 shows a schematic diagram of an example process for using machine classifiers to process data samples in accordance with one or more aspects described herein. The process may be associated with one or more remaining subsets (e.g., the remaining subsets 507A-507B) and one or more machine classifiers (e.g., machine classifiers 509A-509B). The machine classifiers 509A-509B may have been trained as described in connection with FIGS. 5A-5B. The remaining subset 507A and the remaining subset 507B may have different data samples, and may or may not have overlapping data samples.

The remaining subset 507A may be processed by the machine classifier 509A. For example, for each data sample in the remaining subset 507A, the machine classifier 509A may receive input of the data sample, process the data sample based on the model parameters of the machine classifier 509A, and generate a predicted label for the data sample. The data samples from the remaining subset 507A and their corresponding predicted labels generated by the machine classifier 509A may be, for example, in the form shown in output data 601. For example, "data sample 1" from the remaining subset 507A may have "predicted label A1" generated by the machine classifier 509A, "data sample 2" from the remaining subset 507A may have "predicted label A2" generated by the machine classifier 509A, "data sample 3" from the remaining subset 507A may have "predicted label A3" generated by the machine classifier 509A, and "data sample 4" from the remaining subset 507A may have "predicted label A4" generated by the machine classifier 509A. Additional or alternative data samples from the remaining subset 507A may be processed by the machine classifier 509A, and corresponding predicted labels may be generated by the machine classifier 509A.

The remaining subset 507B may be processed by the machine classifier 509B. For example, for each data sample in the remaining subset 507B, the machine classifier 509B may receive input of the data sample, process the data sample based on the model parameters of the machine classifier 509B, and generate a predicted label for the data sample. The data samples from the remaining subset 507B and their corresponding predicted labels generated by the machine classifier 509B may be, for example, in the form shown in output data 603. For example, "data sample 3" from the remaining subset 507B may have "predicted label B3" generated by the machine classifier 509B, "data sample 5" from the remaining subset 507B may have "predicted label B5" generated by the machine classifier 509B, "data sample 8" from the remaining subset 507B may have "predicted label B8" generated by the machine classifier 509B, and "data sample 9" from the remaining subset 507B may have "predicted label B9" generated by the machine classifier 509B. Additional or alternative data samples from the remaining subset 507B may be processed by the machine classifier 509B, and corresponding predicted labels may be generated by the machine classifier 509B.

After processing the data samples of the remaining subsets 507A-507B using the machine classifiers 509A-509B, the computing device may aggregate, for each of one or more data samples from the candidate dataset, predicted labels generated by machine classifiers. For example, the computing device may aggregate the machine classifier predicted labels for "data sample 3" as shown in aggregated data 605. For example, the computing device may retrieve the machine classifier predicted labels for "data sample 3" from output data of machine classifiers (e.g., from the output data 601, 603). The aggregated machine classifier predicted labels for "data sample 3" may comprise, for example, "predicted label A3," "predicted label B3," and/or other predicted labels generated by other machine classifiers. Additionally or alternatively, if the computing device is configured to be interested in checking the labeling integrity for a particular data sample from the candidate dataset, the computing device may configure the trained machine classifiers the remaining subset of each of which comprises the particular data sample to process the data sample and to generate predicted labels for the particular data sample. The predicted labels, for the particular data sample, generated by the trained machine classifiers the remaining subset of each of which comprises the particular data sample may be aggregated.

Based on aggregating the machine classifier predicted labels for each particular data sample of one or more data samples from the candidate dataset, the computing device may determine a degree of consistency among the machine classifier predicted labels for the particular data sample, and may determine a machine classifier consensus label for the particular data sample (e.g., machine classifier consensus label 607), which may be used for checking the labeling integrity of the particular data sample, as described above in connection with FIG. 4B.

Figure 7:
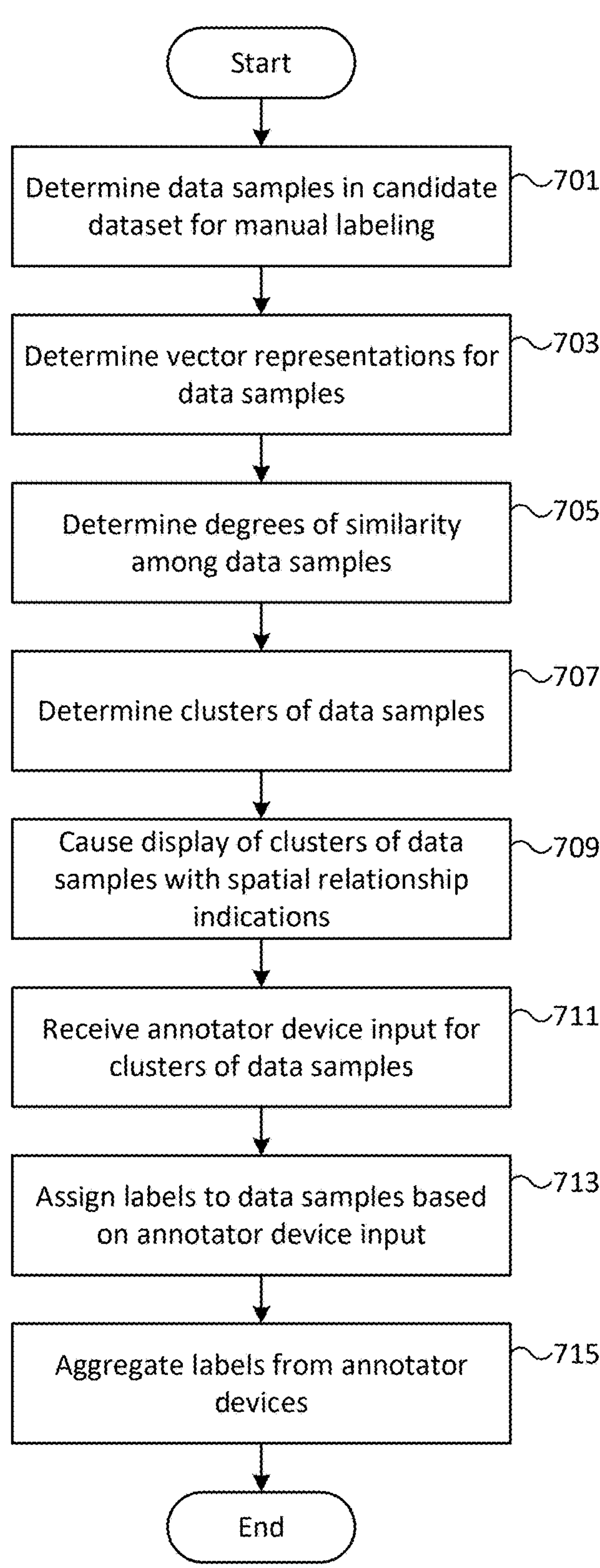
FIG. 7 shows a flowchart of an example method for data labeling using clusters of data samples in accordance with one or more aspects described herein.

FIG. 7 shows a flowchart of an example method for data labeling using clusters of data samples in accordance with one or more aspects described herein. The method may be performed, for example, by one or more of the system as discussed in connection with FIG. 3 (e.g., the server 301, the data sample source device 305, or one or more of the annotator devices 307A-307C). The steps of the method may be described as being performed by particular components and/or computing devices for the sake of simplicity, but the steps may be performed by any component and/or computing device, or by any combination of one or more components and/or one or more computing devices. The steps of the method may be performed by a single computing device or by multiple computing devices. One or more steps of the method may be omitted, added, rearranged, and/or otherwise modified as desired by a person of ordinary skill in the art.

A computing device (e.g., the server 301), an annotator device, and/or any other device may be configured to process the data samples and group the data samples into different clusters, wherein each cluster of the different clusters may comprise data samples having relatively close relationships with each other (e.g., word data samples having similar semantic meanings), and may be configured to display the data samples with indications of the clusters. A human labeler may (e.g., via an annotator device) select a particular cluster of data samples, and may assign one or more labels to the cluster of data samples. The one or more labels assigned to the cluster may be assigned to each data sample of the cluster. The data labeling method using clusters of data samples may help reduce the cognitive burden on human labelers when labeling the data samples, because data samples with relatively close relationships (e.g., sematic meanings) may be grouped into a cluster and human labelers would be able to efficiently label the cluster of data samples. The data labeling method using clusters of data samples may be implemented with various aspects described herein (e.g., the processes associated with FIG. 4A, steps 405, 407).

In step 701, a computing device (e.g., the server 301, an annotator device of the annotator devices 307A-307C, etc.) may determine data samples in a candidate dataset for manual labeling. The candidate dataset may be initialized by being populated with a plurality of data samples (e.g., received from the data sample source device 305). A data sample of the data samples may comprise, for example, a word, a group of multiple words, a phrase, a sentence, a paragraph, a collection of textual data, an utterance, a collection of audio data, an image, a clip of video, and/or the like. The data samples in the candidate dataset may be manually labeled, for example, by human labelers.

In step 703, the computing device may determine vector representations for the data samples in the candidate dataset. For example, the computing device may use neural networks, dimensionality reduction models, probabilistic models, and/or other types of models or methods to process each data sample of the data samples in the candidate dataset, and to generate a vector representation for the data sample. For example, if the data samples comprise words, the vector representations for the data samples may comprise neural word embeddings generated by any of various different types of methods (e.g., a neural network, a neural embedding layer, etc.). A vector representation may have one or more dimensions. For example, if a vector representation with two dimensions is used for a data sample, a vector such as [x, y] may be used to represent the data sample, where each of x and y may be a real number.

In step 705, the computing device may determine degrees of similarity among the data samples of the candidate dataset. For example, a degree of similarity between two data samples may be determined based on the vector representations of the two data samples. The degree of similarity between the two data samples may, for example, correspond to a distance between the vector representations of the two data samples, where a smaller distance may indicate a higher degree of similarity and a larger distance may indicate a lower degree of similarity.

In step 707, the computing device may determine clusters of the data samples of the candidate dataset. The computing device may group the data samples of the candidate dataset into different clusters, for example, based on the degrees of similarity among the data samples. For example, the computing device may add a particular data sample to a cluster (which may be initially populated with one random data sample from the candidate dataset) if the distance between the vector representation of the particular data sample and the vector representation of any data sample in the cluster is smaller than a threshold.

In step 709, the computing device may cause display (e.g., via an annotator device and to a human labeler) of the clusters of data samples (as determined in step 707) with indications of spatial relationships among the data samples. An indication of a spatial relationship between two data samples may be based on (e.g., proportional to) the degree of similarity between the two data samples. For example, if two-dimensional vectors are used to represent data samples, the data samples may be displayed on a two-dimensional plane having a coordinate system including two axes perpendicular to each other. The positions of the data samples to be displayed on the plane may be based on their respective vector representations in accordance with the axes. The spatial relationship indication between two data samples displayed in this way may correspond to the distance between their vector representations.

Figure 8:
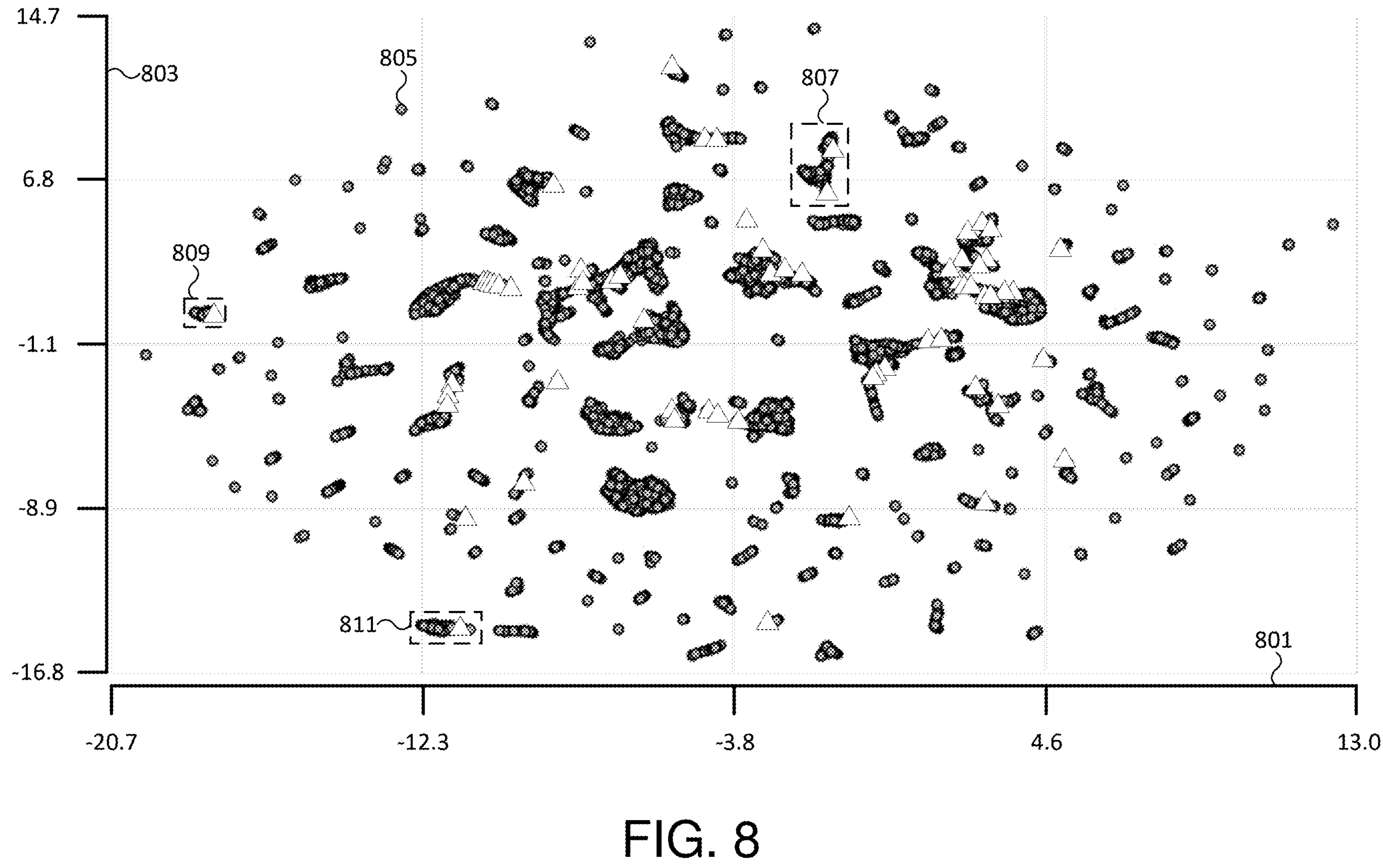
FIG. 8 shows an example of a display of clusters of data samples with spatial relationship indications in accordance with one or more aspects described herein.

FIG. 8 shows an example of a display of clusters of data samples with spatial relationship indications in accordance with one or more aspects described herein. The display of the clusters of data samples may comprise one or more axes (e.g., axis 801, axis 803, etc.), one or more data samples (e.g., data sample 805), and one or more clusters of data samples (e.g., data sample clusters 807, 809, 811). The position of a data sample on the plane as defined by the axis 801 and axis 803 may be determined based on the vector representation of the data sample. For example, if the vector representation for a data sample is [−12.3, 6.8], the location of the data sample on the plane may be the point having a value of −12.3 on the axis 801 and having a value of 6.8 on the axis 803. Data samples with similar vector representations may be located within a cluster (e.g., the data sample cluster 807). The clusters may be determined as described above (e.g., in connection with FIG. 7, step 707). Additionally or alternatively, the display of clusters of data samples may be in one-dimensional form, three-dimensional form, and/or any other form as desired by a person of ordinary skill in the art.

The display of the clusters of data samples may be performed via an interactive user interface of a computing device (e.g., an annotator device of the annotator devices 307A-307C). The clusters of data samples may be displayed, for example, to a user (e.g., a human labeler). The data samples displayed via the user interface may be selected, for example, via a cursor controlled by a human labeler. The data sample clusters displayed via the user interface may additionally or alternatively be selected, for example, via a cursor controlled by a human labeler. For example, the annotator device may receive, via the user interface, user input indicating a selection of a particular data sample cluster. Additionally, the annotator device may receive, via the user interface, user input indicating an assignment of a particular label to the selected data sample cluster. For example, a user may cause a cursor shown on the user interface to move to a place hovering above a data sample cluster, may cause a selection of the data sample cluster via activating the cursor while the cursor is hovering above the data sample cluster, may input via the user interface a label to be assigned to the data sample cluster (e.g., by typing in the label, by selecting the label from a list or drop-down menu, etc.), and may cause the input label to be assigned to the data sample cluster. If a data sample or a data sample cluster has been assigned with a label, the user interface may display an indication of the assignment, such as by changing the color of the displayed indication of the data sample or the data sample cluster (e.g., the dot-shaped symbols as shown in FIG. 8). For example, the user interface may use a first color (represented as circles) to paint the indication of a labeled data sample, and use a second color different from the first color to paint the indication of an unlabeled data sample (represented as triangles) (and use a third color different from the first color and different from the second color to paint the indication of a data sample that is being selected, for example, by a human labeler via a cursor).

With reference back to FIG. 7, in step 711, the computing device (e.g., the server 301, an annotator device of the annotator devices 307A-307C) may receive annotator device input for clusters of data samples. A user (e.g., a human labeler) may input via an annotator device labels to be assigned to clusters of data samples. The annotator device input may comprise, for example, information of the user's assignment of labels to data sample clusters.

In step 713, the computing device may assign labels to data samples based on the annotator device input. For example, a label assigned via an annotator device to a data sample cluster may in turn be assigned to each data sample in the data sample cluster.

In step 715, the computing device may aggregate labels, assigned to data samples, from annotator devices. For example, the data samples in the candidate dataset may be distributed to a number of annotator devices for manual labeling. The computing device may aggregate assigned labels from the annotator devices (e.g., as described in connection with FIG. 4A, step 407). In some examples, the computing device may aggregate the labels, assigned via multiple annotator devices, for a particular data sample.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules may be written in a source code programming language that is subsequently compiled for execution, or may be written in a scripting language such as (but not limited to) HTML, or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method comprising:

determining, by a computing device, an incumbent dataset comprising a first plurality of data samples and a first plurality of labels corresponding to the first plurality of data samples;

determining a candidate dataset for updating the incumbent dataset, wherein the candidate dataset comprises a second plurality of data samples and a second plurality of labels corresponding to the second plurality of data samples;

testing the candidate dataset by a plurality of machine classifiers, wherein each machine classifier of the plurality of machine classifiers comprises a plurality of model parameters, wherein the plurality of model parameters are assigned at random for each machine classifier, and wherein testing the candidate dataset by a given machine classifier, of the plurality of machine classifiers, comprises:

determining, for the given machine classifier, a training subset of the candidate dataset and a remaining subset of the candidate dataset;

training the given machine classifier, based on the incumbent dataset and the training subset, to refine the plurality of model parameters of the given machine classifier; and generating, based on the trained given machine classifier, a first plurality of predicted labels corresponding to a plurality of data samples of the remaining subset;

based on the testing of the candidate dataset by the plurality of machine classifiers, aggregating a second plurality of predicted labels generated based on multiple machine classifiers of the plurality of machine classifiers, the aggregated second plurality of predicted labels corresponding to a candidate data sample of the second plurality of data samples;

determining a degree of consistency of the aggregated second plurality of predicted labels;

based on the degree of consistency of the aggregated second plurality of predicted labels not satisfying a threshold, marking the candidate data sample for additional review;

grouping, based on the marking of the candidate data sample, a plurality of corresponding vector representations of the second plurality of data samples, and degrees of similarity among the second plurality of data samples, the second plurality of data samples into clusters; and updating, based on receiving a single assigned label assigned to a cluster of the clusters of the second plurality of data samples, the candidate dataset to include the single assigned label for all second plurality of data samples in the cluster.

2. The method of claim 1, further comprising:

distributing the second plurality of data samples to a set of annotator devices for manual labeling; and for each data sample of the second plurality of data samples:

receiving a plurality of labels determined via the set of annotator devices; and determining, based on the plurality of labels determined via the set of annotator devices, a consensus label, wherein the second plurality of labels comprises the consensus labels determined for the second plurality of data samples.

3. The method of claim 1, further comprising:

determining, based on the second plurality of data samples, the plurality of corresponding vector representations;

determining, based on the plurality of corresponding vector representations, the degrees of similarity among the second plurality of data samples;

wherein the grouping comprises:

causing display, via a set of annotator devices for manual labeling, of the clusters of data samples with indications of spatial relationships, among the second plurality of data samples, corresponding to the degrees of similarity among the second plurality of data samples; and receiving an indication of the single assigned label assigned to the cluster of the clusters of data samples.

4. The method of claim 1, wherein:

the training subset comprises a first selection of data samples from the candidate dataset; and the remaining subset comprises a second selection of data samples from the candidate dataset, the second selection of data samples being distinct from the first selection of data samples.

5. The method of claim 1, wherein the training subset determined for the given machine classifier of the plurality of machine classifiers is different from a training subset determined for another machine classifier of the plurality of machine classifiers.

6. The method of claim 1, further comprising:

based on the testing of the candidate dataset by the plurality of machine classifiers, aggregating a third plurality of predicted labels generated based on multiple machine classifiers of the plurality of machine classifiers, the third plurality of predicted labels corresponding to a second candidate data sample of the second plurality of data samples;

determining a degree of consistency of the third plurality of predicted labels; and based on the degree of consistency of the third plurality of predicted labels satisfying the threshold, determining a machine classifier consensus label, corresponding to the second candidate data sample, based on the third plurality of predicted labels.

7. The method of claim 6, further comprising:

determining an annotator device consensus label, corresponding to the second candidate data sample, of the second plurality of labels; and based on the machine classifier consensus label corresponding to the annotator device consensus label, adding the second candidate data sample to the incumbent dataset.

8. The method of claim 6, further comprising:

determining an annotator device consensus label, corresponding to the second candidate data sample, of the second plurality of labels; and based on the machine classifier consensus label not corresponding to the annotator device consensus label:

associating the second candidate data sample with the machine classifier consensus label; and marking the second candidate data sample for additional review for removing an association of the second candidate data sample with the annotator device consensus label.

9. The method of claim 1, further comprising:

updating the incumbent dataset based on at least a portion of the candidate dataset; and generating, based on the updated incumbent dataset, a predicted label corresponding to a received data sample.

10. A method comprising:

determining, by a computing device, an incumbent dataset comprising a first plurality of data samples and a first plurality of labels corresponding to the first plurality of data samples;

determining a candidate dataset for updating the incumbent dataset, wherein the candidate dataset comprises a second plurality of data samples and a second plurality of labels corresponding to the second plurality of data samples;

testing the candidate dataset by a plurality of machine classifiers, wherein each machine classifier of the plurality of machine classifiers comprises a plurality of model parameters, and wherein testing the candidate dataset by a given machine classifier, of the plurality of machine classifiers, comprises:

determining, for the given machine classifier, a training subset of the candidate dataset and a remaining subset of the candidate dataset;

training the given machine classifier, based on the incumbent dataset and the training subset, to refine the plurality of model parameters of the given machine classifier; and generating, based on the trained given machine classifier, a first plurality of predicted labels corresponding to a plurality of data samples of the remaining subset;

based on the testing of the candidate dataset by the plurality of machine classifiers, aggregating a second plurality of predicted labels generated based on multiple machine classifiers of the plurality of machine classifiers, the aggregated second plurality of predicted labels corresponding to a candidate data sample of the second plurality of data samples;

determining a degree of consistency of the aggregated second plurality of predicted labels;

based on the degree of consistency of the aggregated second plurality of predicted labels satisfying a threshold, determining a machine classifier consensus label, corresponding to the candidate data sample, based on the aggregated second plurality of predicted labels;

determining an annotator device consensus label, corresponding to the candidate data sample, of the second plurality of labels;

based on the machine classifier consensus label corresponding to the annotator device consensus label, adding the candidate data sample to the incumbent dataset;

grouping, based on the marking of the candidate data sample, a plurality of corresponding vector representations of the second plurality of data samples, and degrees of similarity among the second plurality of data samples, the second plurality of data samples into clusters; and updating, based on receiving a single assigned label assigned to a cluster of the clusters of the second plurality of data samples, the candidate dataset to include the single assigned label for all second plurality of data samples in the cluster.

11. The method of claim 10, further comprising:

based on the testing of the candidate dataset by the plurality of machine classifiers, aggregating a third plurality of predicted labels generated based on multiple machine classifiers of the plurality of machine classifiers, the third plurality of predicted labels corresponding to a second candidate data sample of the second plurality of data samples;

determining a degree of consistency of the third plurality of predicted labels;

based on the degree of consistency of the third plurality of predicted labels satisfying the threshold, determining a second machine classifier consensus label, corresponding to the second candidate data sample, based on the third plurality of predicted labels;

determining a second annotator device consensus label, corresponding to the second candidate data sample, of the second plurality of labels; and based on the second machine classifier consensus label not corresponding to the second annotator device consensus label:

associating the second candidate data sample with the second machine classifier consensus label; and marking the second candidate data sample for additional review for removing an association of the second candidate data sample with the second annotator device consensus label.

12. The method of claim 10, further comprising:

distributing the second plurality of data samples to a set of annotator devices for manual labeling; and for each data sample of the second plurality of data samples:

receiving a plurality of labels determined via the set of annotator devices; and determining, based on the plurality of labels determined via the set of annotator devices, a consensus label, wherein the second plurality of labels comprises the consensus labels determined for the second plurality of data samples.

13. The method of claim 10, further comprising:

determining, based on the second plurality of data samples, the plurality of corresponding vector representations;

determining, based on the plurality of corresponding vector representations, the degrees of similarity among the second plurality of data samples;

wherein the grouping comprises:

causing display, via a set of annotator devices for manual labeling, of the clusters of data samples with indications of spatial relationships, among the second plurality of data samples, corresponding to the degrees of similarity among the second plurality of data samples; and receiving an indication of the assigned label assigned to the cluster of the clusters of data samples.

14. The method of claim 10, wherein:

the training subset comprises a first selection of data samples from the candidate dataset; and the remaining subset comprises a second selection of data samples from the candidate dataset, the second selection of data samples being distinct from the first selection of data samples.

15. The method of claim 10, wherein the training subset determined for the given machine classifier of the plurality of machine classifiers is different from a training subset determined for another machine classifier of the plurality of machine classifiers.

16. The method of claim 10, further comprising:

based on the testing of the candidate dataset by the plurality of machine classifiers, aggregating a third plurality of predicted labels generated based on multiple machine classifiers of the plurality of machine classifiers, the third plurality of predicted labels corresponding to a second candidate data sample of the second plurality of data samples;

determining a degree of consistency of the third plurality of predicted labels; and based on the degree of consistency of the third plurality of predicted labels not satisfying the threshold, marking the second candidate data sample for additional review.

17. The method of claim 10, further comprising:

updating the incumbent dataset based on at least a portion of the candidate dataset; and generating, based on the updated incumbent dataset, a predicted label corresponding to a received data sample.

18. An apparatus comprising:

one or more processors; and memory storing instructions that, when executed by the one or more processors, cause the apparatus to:

determine an incumbent dataset comprising a first plurality of data samples and a first plurality of labels corresponding to the first plurality of data samples;

determine a candidate dataset for updating the incumbent dataset, wherein the candidate dataset comprises a second plurality of data samples and a second plurality of labels corresponding to the second plurality of data samples;

test the candidate dataset by a plurality of machine classifiers, wherein each machine classifier of the plurality of machine classifiers comprises a plurality of model parameters, and wherein testing the candidate dataset by a given machine classifier, of the plurality of machine classifiers, comprises:

determining, for the given machine classifier, a training subset of the candidate dataset and a remaining subset of the candidate dataset;

training the given machine classifier, based on the incumbent dataset and the training subset, to refine the plurality of model parameters of the given machine classifier; and generating, based on the trained given machine classifier, a first plurality of predicted labels corresponding to a plurality of data samples of the remaining subset;

based on the testing of the candidate dataset by the plurality of machine classifiers, aggregate a second plurality of predicted labels generated based on multiple machine classifiers of the plurality of machine classifiers, the aggregated second plurality of predicted labels corresponding to a candidate data sample of the second plurality of data samples;

determining a degree of consistency of the aggregated second plurality of predicted labels;

mark the candidate data sample for additional review based on the degree of consistency of the aggregated second plurality of predicted labels being below a threshold;

group, based on the marking of the candidate data sample, a plurality of corresponding vector representations of the second plurality of data samples, and degrees of similarity among the second plurality of data samples, the second plurality of data samples into clusters;

update, based on receiving a single assigned label assigned to a cluster of the clusters of the second plurality of data samples, the candidate dataset to include the single assigned label for all second plurality of data samples in the cluster; and when the degree of consistency of the aggregated second plurality of predicted labels satisfies the threshold:

determine a machine classifier consensus label, corresponding to the candidate data sample, based on the aggregated second plurality of predicted labels;

determine an annotator device consensus label, corresponding to the candidate data sample, of the second plurality of labels; and add the candidate data sample to the incumbent dataset based on the machine classifier consensus label corresponding to the annotator device consensus label.

19. The apparatus of claim 18, wherein the instructions, when executed by the one or more processors, further cause the apparatus to, when the degree of consistency of the second plurality of predicted labels satisfies the threshold:

when the machine classifier consensus label does not correspond to the annotator device consensus label:

associate the candidate data sample with the machine classifier consensus label; and mark the candidate data sample for additional review for removing an association of the candidate data sample with the annotator device consensus label.

20. The apparatus of claim 18, wherein the instructions, when executed by the one or more processors, further cause the apparatus to:

determine, based on the second plurality of data samples, the plurality of corresponding vector representations;

determine, based on the plurality of corresponding vector representations, the degrees of similarity among the second plurality of data samples;

wherein the grouping comprises:

cause display, via a set of annotator devices for manual labeling, of the clusters of data samples with indications of spatial relationships, among the second plurality of data samples, corresponding to the degrees of similarity among the second plurality of data samples; and receive an indication of the single assigned label assigned to the cluster of the clusters of data samples.

* * * * *